Oct. 20, 1953      T. LELAND      2,656,039
PNEUMATIC ASH TRAY FOR AUTOMOTIVE VEHICLES
Filed Nov. 30, 1949      5 Sheets-Sheet 1
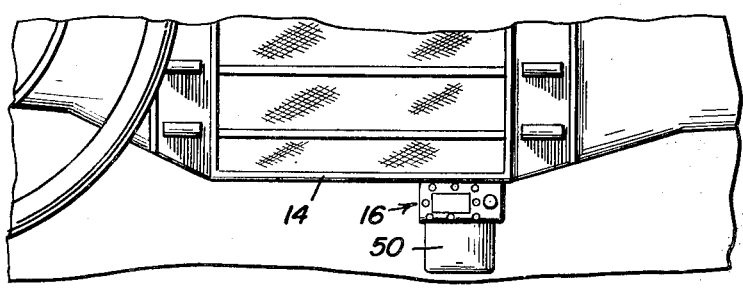
Fig. 1.
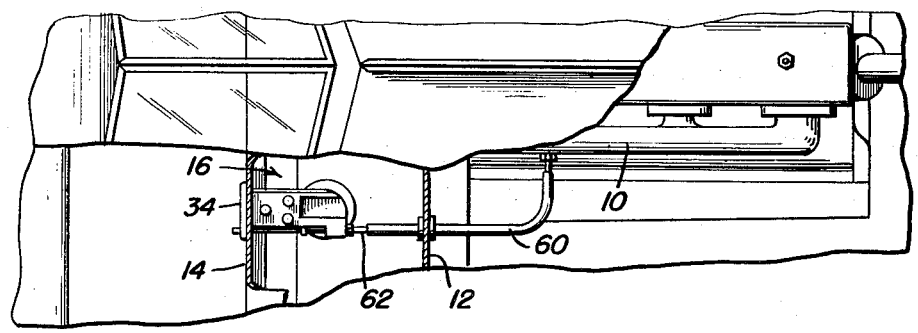
Fig. 2.
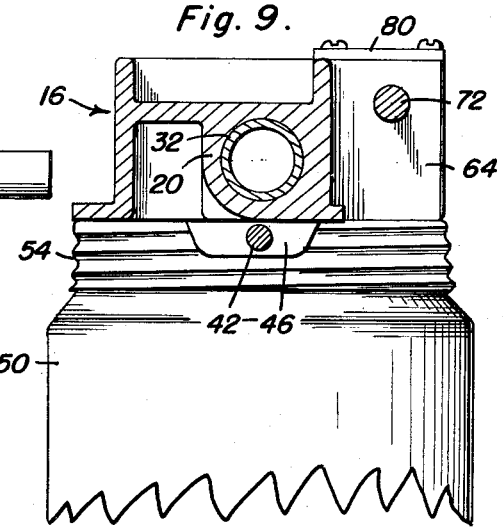
Fig. 9.
Fig. 14.
Fig. 15.
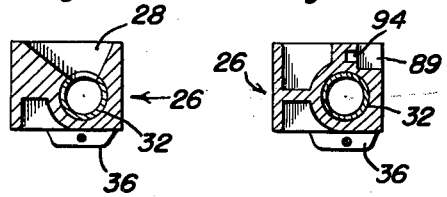
Fig. 16.     Fig. 17.
Inventor
Ted Leland
By *Clarence A. O'Brien and Harvey B. Jacobson*
Attorneys Oct. 20, 1953
T. LELAND
2,656,039
PNEUMATIC ASH TRAY FOR AUTOMOTIVE VEHICLES
Filed Nov. 30, 1949
5 Sheets-Sheet 2
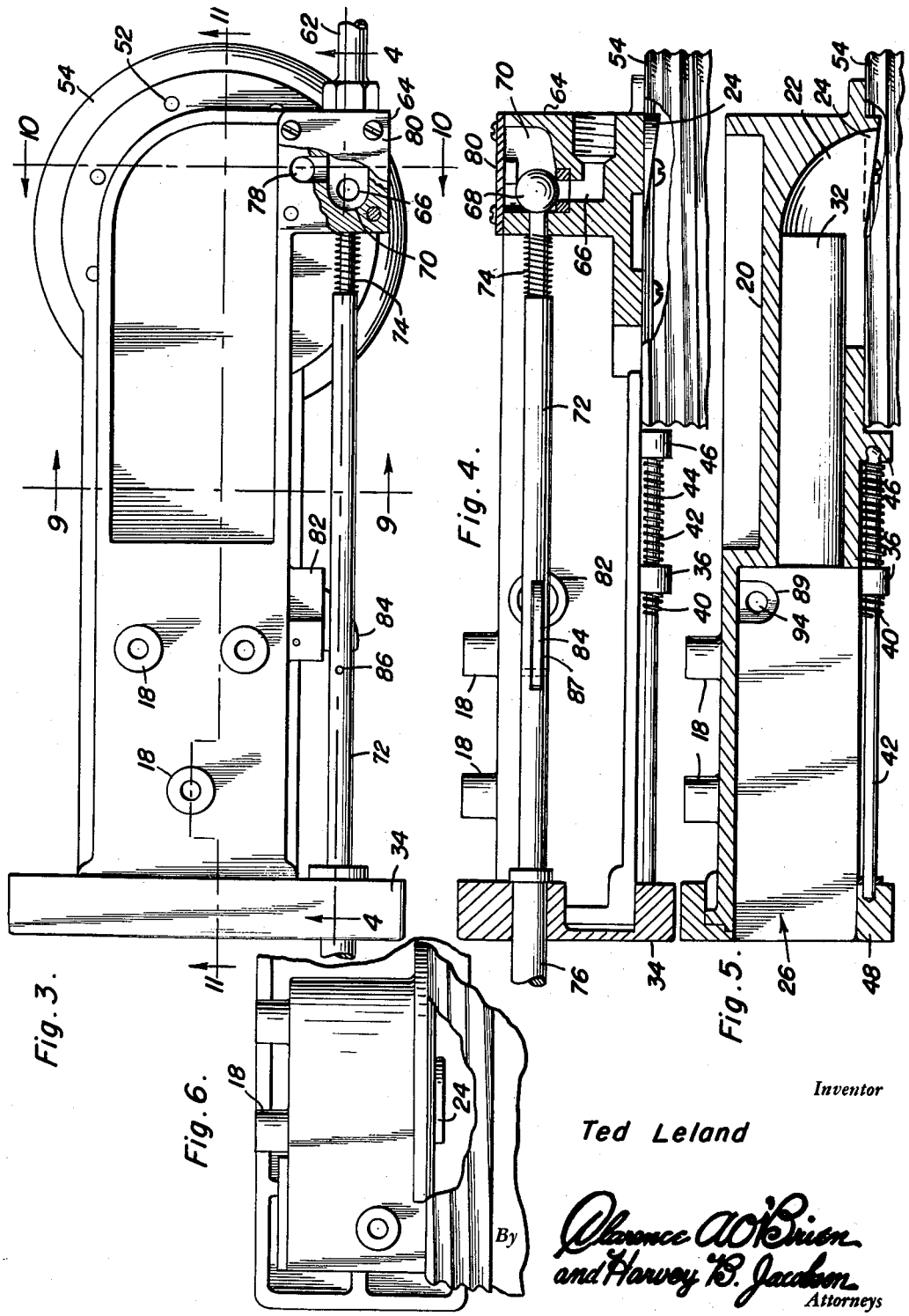
Inventor
Ted Leland

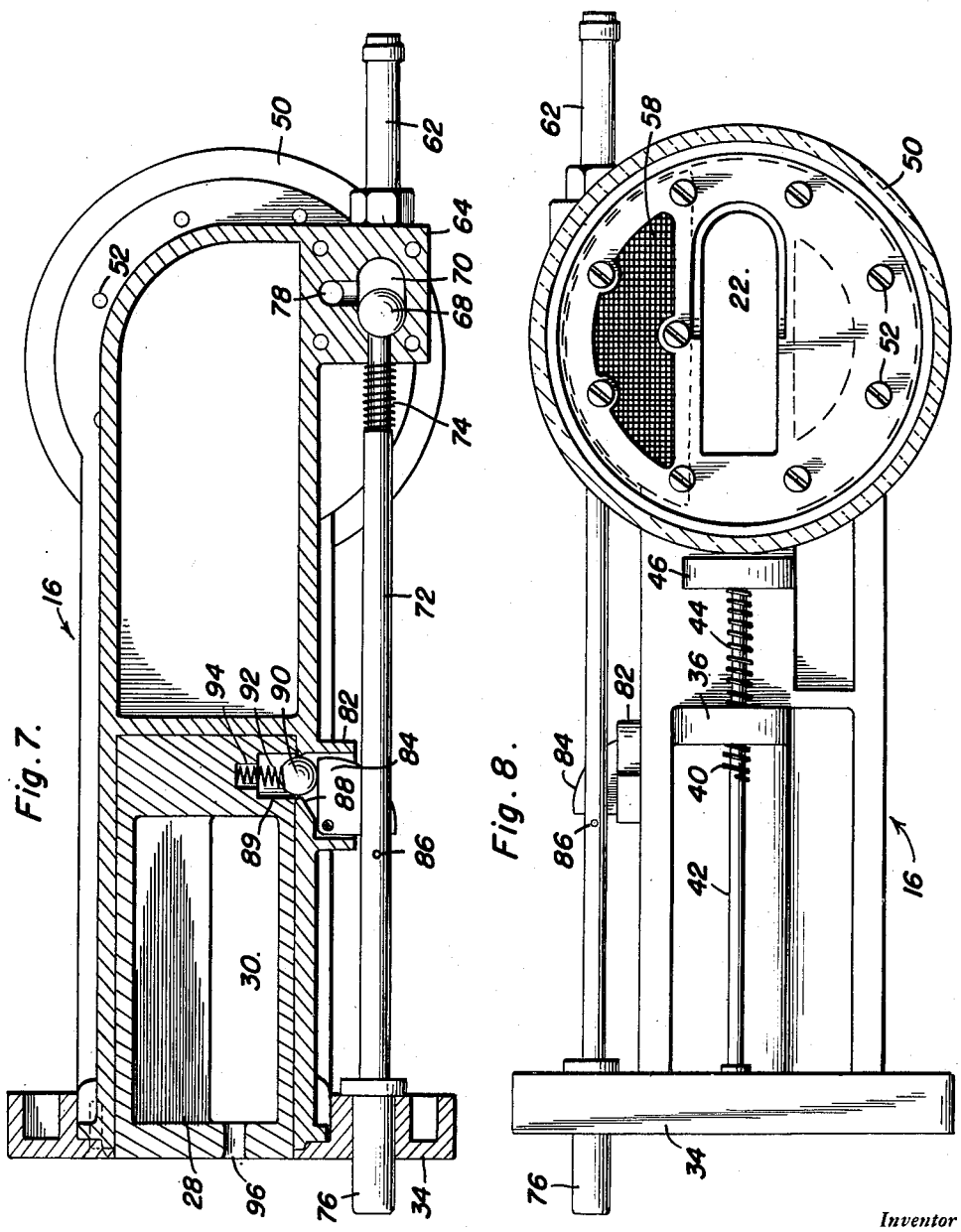

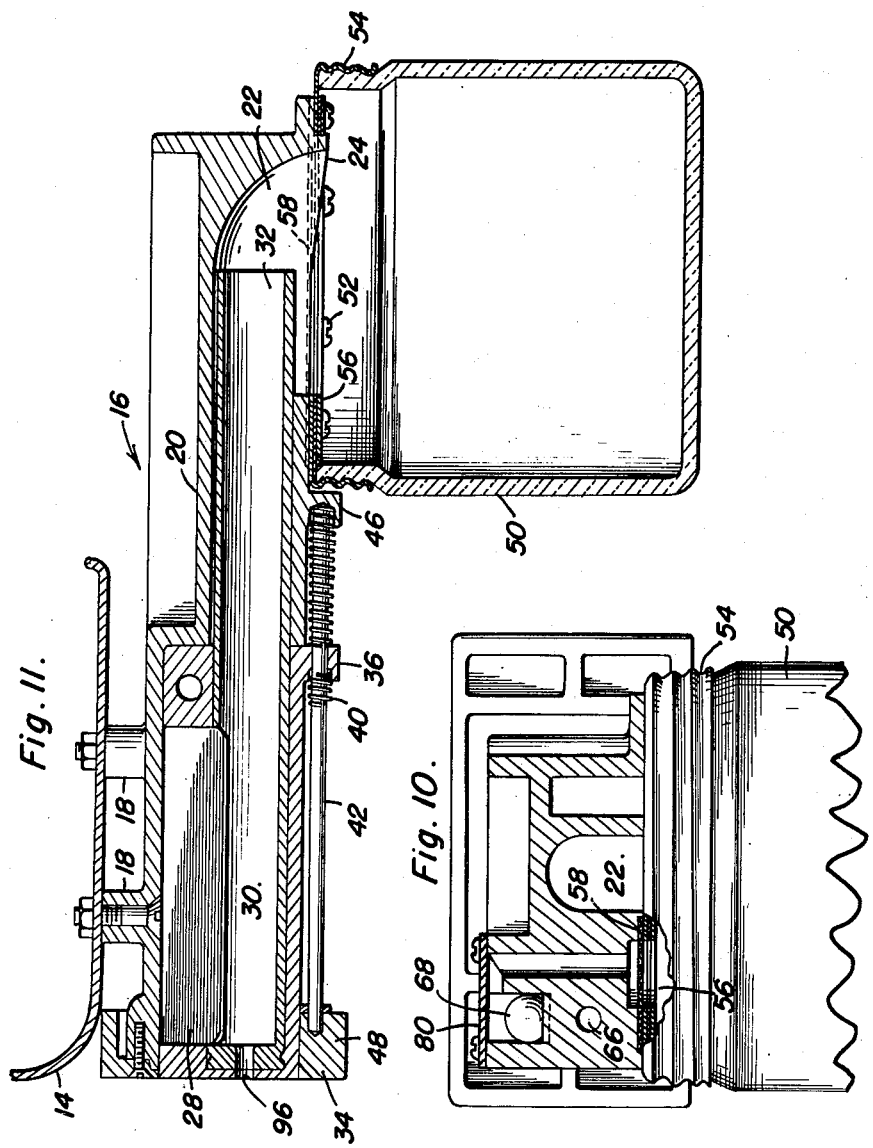

Oct. 20, 1953 T. LELAND 2,656,039
PNEUMATIC ASH TRAY FOR AUTOMOTIVE VEHICLES
Filed Nov. 30, 1949 5 Sheets-Sheet 5
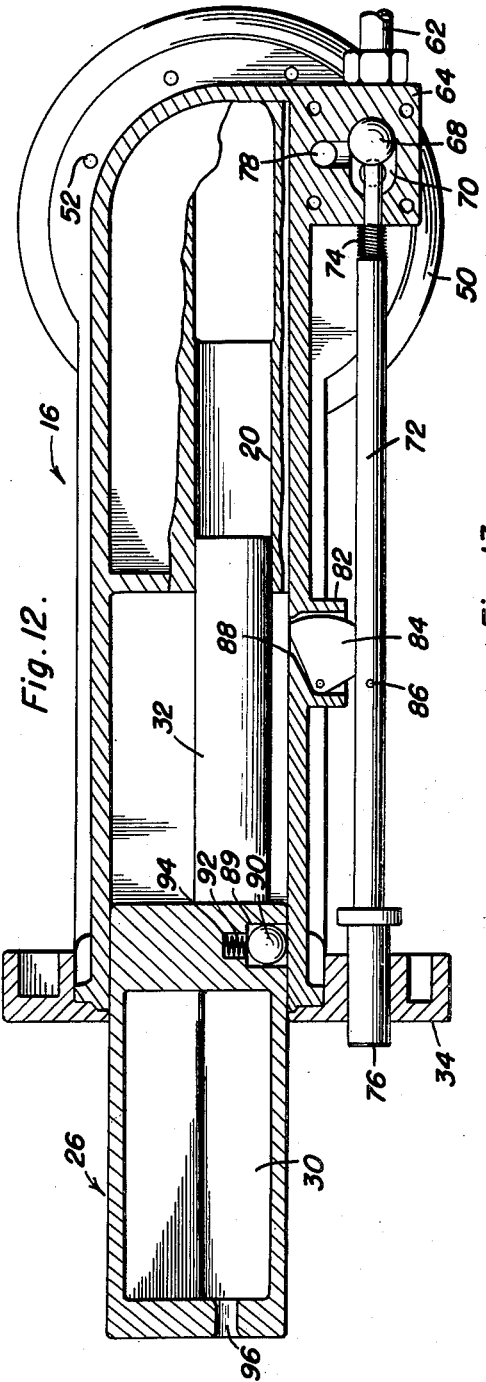
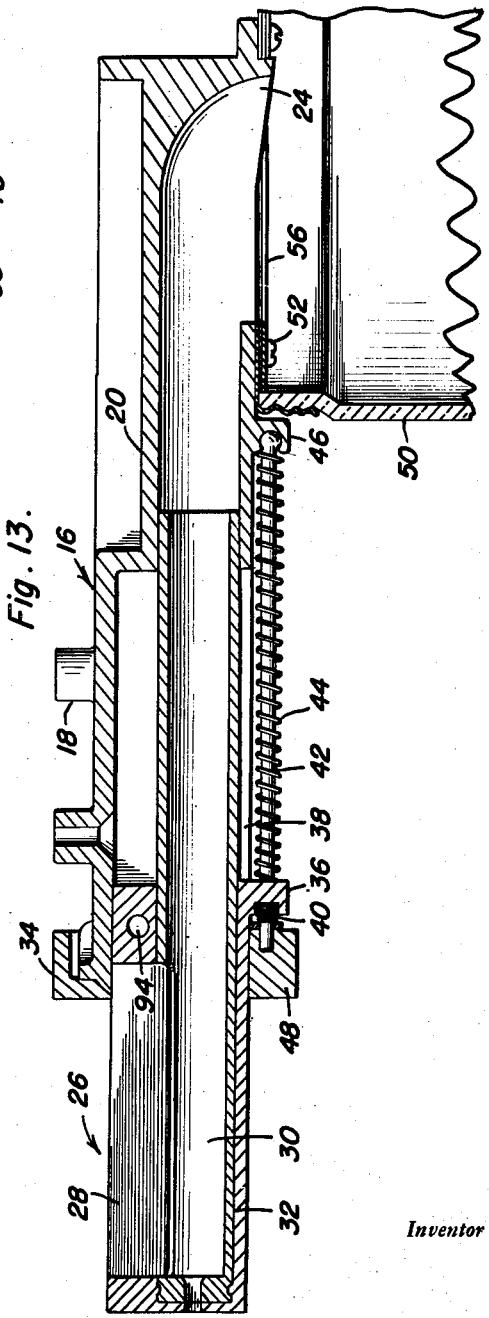
Inventor
Ted Leland
By *Clarence A. O'Brien and Harvey B. Jacobson*
Attorneys Patented Oct. 20, 1953

2,656,039

UNITED STATES PATENT OFFICE 2,656,039

PNEUMATIC ASH TRAY FOR AUTOMOTIVE VEHICLES

Ted Leland, Sacramento, Calif.

Application November 30, 1949, Serial No. 130,196

5 Claims. (Cl. 206—19.5)

This invention relates generally to automotive vehicles and more particularly to a pneumatic ash tray comprising an accessory for automotive vehicles.

A primary object of this invention is to provide an ash tray construction for vehicles of a character adapted to encourage its regular use, thus decreasing the likelihood of lighted cigarettes, cigars, and matches being thrown from the vehicle and causing grass, brush and forest fires. With this end in view, the ash tray has been designed with features which will interest the driver and passengers to a degree assuring the use of the device until such use becomes a habit. One feature in the operation of the device which will thus interest the user is the fact that the pressing of a button will cause the ash tray to snap into extended position, while a second pressing of the same button will cause a cigarette butt or the like to be whipped out of sight without the ash tray being retracted.

The installation of ash tray assemblies according to this invention in pleasure and commercial boats will eliminate the hazard of fire due to igniting gas fumes which have a tendency to collect in pockets in all types of water craft.

Still another object of this invention is to prevent the unpleasant odor of stale tobacco which emanates from the ordinary type of automotive ash tray.

In brief, the instant invention comprises an ash tray slidably mounted in a frame on the instrument board of the motor vehicle. In extended position, this ash tray will receive cigarette butts, ashes and the like, and this material will roll by gravity into a depressed portion of the tray. The tray has a tubular portion extending toward a removable ash receptacle having a valved connection with a tube leading through the fire wall to the induction system of the engine. The valve controlling the suction through the tube is mechanically linked with a latch to hold the ash tray in retracted position. When the latch-valve operating button is pressed, the contents of the ash tray are sucked through the tubular portion of the ash tray into the said receptacle which will be placed in an accessible but preferably hidden portion of the vehicle. The ash tray is evacuated of its contents on the pressure of said button when the ash tray is in either extended or retracted position, since provision is made for the opening of the valve without the unlatching of the ash tray from its retracted position.

With the above mentioned objects definitely in view, this invention resides in certain novel features of construction, combination and arrangement of elements and portions as will be now described in greater detail in the specification, illustrated in the drawings, and particularly pointed out in the appended claims.

In the drawings:

Figure 1 is a fragmentary plan view of a portion of an automotive vehicle with this invention operatively applied thereon;

Figure 2 is another plan view of a portion of an automobile with this invention applied thereon, a part of the hood and other superficial elements being broken away to show the general arrangement of the invention with reference to the vehicle;

Figure 3 is a top plan view of the main portion of the device, a part of a small cover plate being broken away to show the valve construction, the ball of the valve being removed;

Figure 4 is a vertical sectional view taken substantially on the line 4—4 in Figure 3;

Figure 5 is a view similar to Figure 4 and taken on a line just inside the right-hand side wall of the casing;

Figure 6 is a fragmentary end elevational view of the structure shown in Figure 3, with portions broken away to show underlying parts;

Figure 7 is a horizontal sectional view, taken on a plane beneath the top wall of the casing;

Figure 8 is a bottom plan view of the structure shown in Figure 7 with the part designated the ash receptacle, to differentiate the same from the ash tray proper, shown in section;

Figure 9 is a vertical sectional view taken substantially on the line 9—9 in Figure 3;

Figure 10 is a vertical transverse sectional view taken substantially on the line 10—10 of Figure 3;

Figure 11 is a vertical sectional view taken substantially on the line 11—11 in Figure 3;

Figure 12 is a horizontal sectional view taken on a plane through the tubular portion of the ash tray, which tubular portion is shown in plan;

Figure 13 is a vertical sectional view taken on a longitudinal center line of the casing;

Figures 14 and 15 are side and plan views of the ash tray proper removed from the other elements of this invention; and Figures 16 and 17 are vertical transverse sectional views taken substantially on the lines 16—16 and 17—17, respectively.

Similar characters of reference designate similar or identical elements and portions throughout the specification and throughout the different views in the drawings.

Referring now to the drawings in detail, the environment wherewith this invention will be used will ordinarily include an automotive vehicle having an engine with a fuel induction system indicated at 10, a fire wall 12, and an instrument board 14. The main casing of the device, generally indicated by the numeral 16, will be secured to the instrument board, preferably underneath the same, and bosses 18 will be provided with suitable bores to facilitate such attachment. The casing 16 will have a tubular portion 20 leading to an outlet 22 at the end of the casing adjacent the front of the vehicle, and it will be noted that the casing is provided with a depending lip 24 surrounding the outlet 22.

The ash tray proper, generally indicated by the numeral 26, includes a depressed portion or compartment 28 communicating with a further depressed portion 30 which may constitute one end of a tubular portion 32 of the ash tray. The tubular portion 32 of the ash tray is telescopically arranged in the tubular portion 20 of the casing, so that the ash tray is slidably mounted in the casing and at all times in communication with the outlet 22.

A decorative face plate 34, suitably apertured to allow the main portion of the ash tray 26 to move therethrough, will be secured in any suitable manner to the end of the casing remote from the tubular portion 20, and it will be noted that the ash tray 26 has a depending lug 36 slidably mounted in a slot 38 extending longitudinally of the casing, as best illustrated in Figure 13. A helical spring 40 acts as a buffer to cushion the arresting of the ash tray when it reaches its extended position, this spring 40 being coaxially arranged on a rod 42, upon which rod another spring 44 is coaxially mounted, and it will be noted that the rod 42 is terminally mounted in bosses 46 and 48 provided on the under side of the casing and aligned with the lug 36, the spring 44 being compressed between the lug 36 and the boss 46 in order to bias the ash tray into extended position.

An ash receptacle 50, ordinarily a glass jar, or a jar of any suitable material which is incombustible and transparent, will be secured to the casing underneath the outlet 22 and in communication therewith, the receptacle 50 being secured by any suitable means illustrated in the drawings as comprised of an attachment plate held in place by screws 52 threaded into the casing, together with a threaded ring coacting with a threaded top portion of the receptacle 50, as indicated at 54, and a complement of gaskets 56. It should be carefully noted that the screened outlet 58, best represented in Figures 8 and 10, is at the upper end of the receptacle 50 and laterally spaced from the outlet 22. The screened outlet 58 prevents larger particles from being drawn into the induction system of the engine while effectually evacuating the smoke and fumes from the ash tray system.

A suction tube 60 is secured at one end to any suitable portion of the induction system 10 of the engine and this tube is led through the fire wall 12 for connection to a nipple 62 provided on the adjacent end of the casing. The nipple 62 leads to a suitably bored laterally extending portion 64 of the casing, the bore 66 therein leading from the nipple 62 to a valve construction having a ball 68 with a valve seat and a recess 70 in the laterally extending portion 64, allowing the ball to be moved from the valve seat in order to open the channel 66, all as will be clearly understood from an inspection of the figures, particularly Figure 4.

The ball 68 is operated by a push rod 72 slidably and terminally mounted in the laterally extending portion 64 of the casing and a suitably bored portion of the face plate 34. A spring 74 biases the push rod 72 in a direction away from the ball 68 so that this ball ordinarily seats on its valve seat to close the channel 66, thus preventing undue interference with the normal operation of the induction system in the engine. The push rod 72 terminates, exteriorly of the face plate 34, in what may be considered a push button 76 and it will be clear how the valve is controlled manually by a driver or passenger in the vehicle, the ball 68 rolling down into valve-closing position, under the force of gravity, when the push rod 72 is released. The recess 70 communicates with another bore 78 communicating with the ash receptacle 50, through the screened outlet 58, and in this connection it should be noted that a small cover plate 80 is used to close the upper ends of the recess 70 and the bore 78, this cover plate being preferably secured by screws, as clearly indicated in the drawings.

The casing has a laterally extending boss 82, aligned with the laterally extending portion 64 and the push rod 72 and a swinging latch 84 is pivoted within the extending boss 82, and the push rod 72 is provided with a horizontally extending slot 87 with a transversely extending actuating pin 86, the slot being indicated in Figure 4. Actuation of the push rod 72 will pivot the latch 84 to move into and out of an aperture 88 provided in the sides of the casing, this aperture being of a size to accommodate snugly a ball 90, which ball is free to move from a recess 89 provided in the side of the ash tray 26, under the influence of a coiled spring 92 positioned in a further recess 94 communicating with the recess 89, so that the ball will move partially from the recess 89 into the aperture 88, under the influence of the spring 92 when the ash tray is in fully retracted position, as illustrated in Figure 7, although actuation of the push rod 72 will cause the latch 84 to push the ball 90 fully into the recess 89 to allow the ash tray to move into extended position under the influence of the spring 44.

It is important to note that a breather aperture 96 is provided in the casing to register with the outer end of depressed portion 30 of the ash tray. This aperture 96 allows draft of air into the ash tray when in retracted position, thus permitting evacuation of the ash tray when retracted.

The operation of this invention will be clearly understood from a consideration of the foregoing description of the mechanical details thereof, taken in connection with the drawings and the above recited objects and brief description of this invention. It should be carefully noted, however, that the push button 76 may be pushed in part way to open the valve without releasing the ash tray 26 from its retracted position. This action is desirable at the time when the ash tray has been retracted manually and it is desired to evacuate the ash tray into the receptacle 50, and thus prevent the odor of stale tobacco from escaping into the vehicle. It will be clear that all the objects are amply achieved by this invention, and further description would appear unnecessary.

Having described the invention, what is claimed as new is:

1. An ash remover for use with a vehicle having an internal combustion engine provided with a fuel induction system, comprising a casing adapted to be mounted in said vehicle, an ash tray slidably mounted in said casing, said ash tray being movable into an extended position and into a retracted position, a suction tube connected to said induction system and to said casing, an ash receptacle detachably connected on said casing, said casing having a passage extending between said tube and said receptacle, said casing having a second passage extending between said ash tray and said receptacle, a valve in said first-mentioned passage, a spring biased actuating rod for said valve, a swinging latch on said casing, a spring pressed detent mounted in said ash tray, said casing having a recess engageable by said detent, stop means on said actuating rod manipulating said swinging latch, and resilient means biasing said ash tray to extended position.

2. An ash remover for use with a vehicle having an internal combustion engine provided with a fuel induction system, comprising a casing adapted to be mounted in said vehicle, an ash tray slidably mounted in said casing, said ash tray being movable into an extended position and into a retracted position, a suction tube connected to said induction system and to said casing, an ash receptacle detachably connected on said casing, said casing having a passage extending between said tube and said receptacle, said casing having a second passage extending between said ash tray and said receptacle, a valve in said first-mentioned passage, and a spring biased actuating rod for said valve, said ash tray having an aperture therein whereby air flows through said ash tray when said valve is opened.

3. For use with an automotive vehicle having an instrument board and an internal combustion engine with a fuel induction system, an ash disposal device comprising an elongated casing adapted to be mounted on said board, an ash tray slidably mounted in said casing, for longitudinal sliding movement into an extended position and into a retracted position, an ash receptacle detachably mounted on said casing, an extensible tubular connection between said ash tray and said receptacle, a suction tube adapted to be operatively connected to said induction system, a passage in said casing, said passage communicating with said ash receptacle, said suction tube being connected to said passage, a valve in said passage, said extensible tubular connection connecting said ash tray to said ash receptacle in all positions of said ash tray, a longitudinally extending slot in said casing, a depending lug on said ash tray, said lug being adapted to slide in said slot, bosses mounted on said casing in alignment with said slot, a guide rod mounted between said bosses, said lug having sliding engagement with said guide rod, a spring mounted between said lug and one of said bosses for yieldingly urging said ash tray into extended position.

4. For use with an automotive vehicle having an instrument board and an internal combustion engine with a fuel induction system, an ash disposal device comprising an elongated casing adapted to be mounted on said board, an ash tray slidably mounted in said casing, for longitudinal sliding movement into an extended position and into a retracted position, an ash receptacle detachably mounted on said casing, an extensible tubular connection between said ash tray and said receptacle, a suction tube adapted to be operatively connected to said induction system, a passage in said casing, said passage communicating with said ash receptacle, said suction tube being connected to said passage, a valve in said passage, said extensible tubular connection connecting said ash tray to said ash receptacle in all positions of said ash tray, a longitudinally extending slot in said casing, a depending lug on said ash tray, said lug being adapted to slide in said slot, bosses mounted on said casing in alignment with said slot, a guide rod mounted between said bosses, said lug having sliding engagement with said guide rod, a spring mounted between said lug and one of said bosses for yieldingly urging said ash tray into extended position, a spring pressed detent operative to retain said ash tray in retracted position in said casing, a latch finger for disengaging said detent, and a push rod operative to actuate said detent and open said valve.

5. An ash disposal device according to claim 4 wherein said extensible tubular connection includes telescoping tubular members, said ash tray having a depressed channel portion directly communicating with said telescoping tubular members.

TED LELAND.

References Cited in the file of this patent

UNITED STATES PATENTS

| Number | Name | Date |
|---|---|---|
| 1,992,450 | Sporman | Feb. 26, 1935 |
| 2,335,094 | Wesselhoeft | Nov. 23, 1943 |
| 2,435,687 | Latin | Feb. 10, 1948 |
| 2,461,815 | Gill | Feb. 15, 1949 |
| 2,559,178 | Thompson | July 3, 1951 |